(12) United States Patent
Youngwerth et al.

(10) Patent No.: US 9,097,289 B2
(45) Date of Patent: Aug. 4, 2015

(54) FRICTION PLATE DESIGN FOR MULTI-PLATE WET FRICTION CLUTCH

(71) Applicants: Albert J. Youngwerth, Boise, ID (US); Sean G. Brown, Boise, ID (US); Karl E. Jensen, Meridian, ID (US)

(72) Inventors: Albert J. Youngwerth, Boise, ID (US); Sean G. Brown, Boise, ID (US); Karl E. Jensen, Meridian, ID (US)

(73) Assignee: REKLUSE MOTOR SPORTS, Boise, ID (US)

( * ) Notice: Subject to any disclaimer, the term of this patent is extended or adjusted under 35 U.S.C. 154(b) by 12 days.

(21) Appl. No.: 14/094,144

(22) Filed: Dec. 2, 2013

(65) Prior Publication Data

US 2015/0152923 A1 Jun. 4, 2015

(51) Int. Cl.
*F16D 13/64* (2006.01)
*F16D 69/00* (2006.01)

(52) U.S. Cl.
CPC .......... *F16D 13/64* (2013.01); *F16D 2069/004* (2013.01)

(58) Field of Classification Search
USPC ...................................... 192/113.36
See application file for complete search history.

(56) References Cited

U.S. PATENT DOCUMENTS

| 7,980,375 B2 * | 7/2011 | Suzuki et al. ............. 192/107 R |
| 2007/0102258 A1 * | 5/2007 | Miyazaki et al. ........ 192/113.36 |
| 2010/0044182 A1 * | 2/2010 | Sakabe et al. ............ 192/113.36 |

* cited by examiner

*Primary Examiner* — Richard Lorence

(57) ABSTRACT

An improved friction plate is disclosed. The friction plate incorporates friction pads having substantially V Shaped Grooves having an angle offset to the axis of rotation to improve oil flow characteristics to the center of the friction plate to reduce parasitic drag when the clutch system is in a disengaged state. The improved friction pad design optionally incorporates a V shaped groove extending to the tab portion of the friction plate to improve the capture of oil as the friction plate rotates through an oil bath.

9 Claims, 6 Drawing Sheets

FRICTION PLATE DESIGN FOR MULTI-PLATE WET FRICTION CLUTCH

BACKGROUND OF THE INVENTION

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

Typically, such clutch systems include a clutch disengagement system consisting of a lever mechanically coupled to the pressure plate such that when the lever is actuated, the pressure plate's compressive force on the clutch pack is removed, disconnecting the rotational coupling between the clutch input and clutch output. Clutch disengagement systems typically couple the lever to the pressure plate mechanically through a hydraulic actuation system or a cable actuation system.

Most motorcycles incorporate a manual transmission coupled to the engine via a multi-plate clutch assembly in an oil bath. Typically, the multi-plate clutch is engaged/disengaged by the operator via a lever mounted on the handlebar. Engines with high output, require more spring pressure to transmit the torque of the engine. The operator must overcome this spring pressure at the lever to disengage the clutch. Excessive spring force can cause fatigue for the operator.

A typical multi-plate clutch system, such as the clutch system incorporated in a 2011 Honda CRF-450R uses a clutch pack incorporating 8 friction plates coupled to the clutch input and 7 driven plates coupled to the clutch output. The friction plates are 3 mm thick and the driven plates are 1.6 mm thick. By configuring the clutch with 1.8 mm thick friction plates and 1.2 mm drive plates, a clutch pack can be configured using 12 friction plates and 11 driven plates in approximately the same space. With the additional number of friction surfaces, spring force in the clutch can be reduced by ⅓ and still transfer the same amount of torque as the 8 friction plate clutch pack providing a significant benefit to the operator in terms of reduced clutch lever effort.

However, as more clutch plates are added to the clutch system, parasitic drag is increased during clutch disengagement. Parasitic drag is torque transferred between the clutch input and the clutch output when the clutch lever is in the disengaged position. Parasitic drag has many causes. One cause is the incidental contact between adjacent friction and drive plates. Another cause is inadequate distribution of oil between the friction and drive plates. Parasitic drag can make it difficult for the operator to find neutral position of the transmission at idle speed, make it difficult to change gears during operation, or cause the motorcycle to drag forward as engine speed is increased with the clutch lever disengaged.

Multi-plate clutch systems typically deliver oil to the clutch pack through two different mechanisms: by the flow oil under centrifugal force as it flows from the inside to the outside of the clutch pack or from the outside inwards as the clutch system rotates in a bath of oil, the rotation in the bath forcing oil into the plates. In many clutch system designs, there is very little oil coming from the inside of the clutch. In clutch systems that rotate in an oil bath, generally no design considerations are made to help oil flow into the clutch pack before centrifugal forces push the oil back out of the clutch pack.

Therefore a need exists for an improved friction plate design that better distributes oil between the friction and drive plates to improve lubrication and to help keep the plates separated to reduce incidental contact to reduce the effects of parasitic drag.

A preferred embodiment of the present invention is shown in FIG. 1.

DETAILED DESCRIPTION OF THE INVENTION

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for a friction plate having improved oil capture and oil flow characteristics to reduce the effects of parasitic drag between the clutch plates. The improved friction plate incorporates a friction pad incorporating a V shaped channel designed to capture oil as it flows across the plate and channel the oil volume into a small space near the center of the friction plate to create a higher pressure "peak" of oil as the oil flows out of the channel. The oil "peak" helps keep each friction plate spaced equally apart and lubricates the plates to reduce parasitic drag. Furthermore a V shaped channel extending out to the outermost tab portion of the friction disk beneficially captures oil as the friction plate rotates through an oil bath increasing the flow of oil to the center of the clutch plate.

The preferred embodiment of the present invention is designed to work in a clutch system with a counterclockwise rotation.

Figure 1:
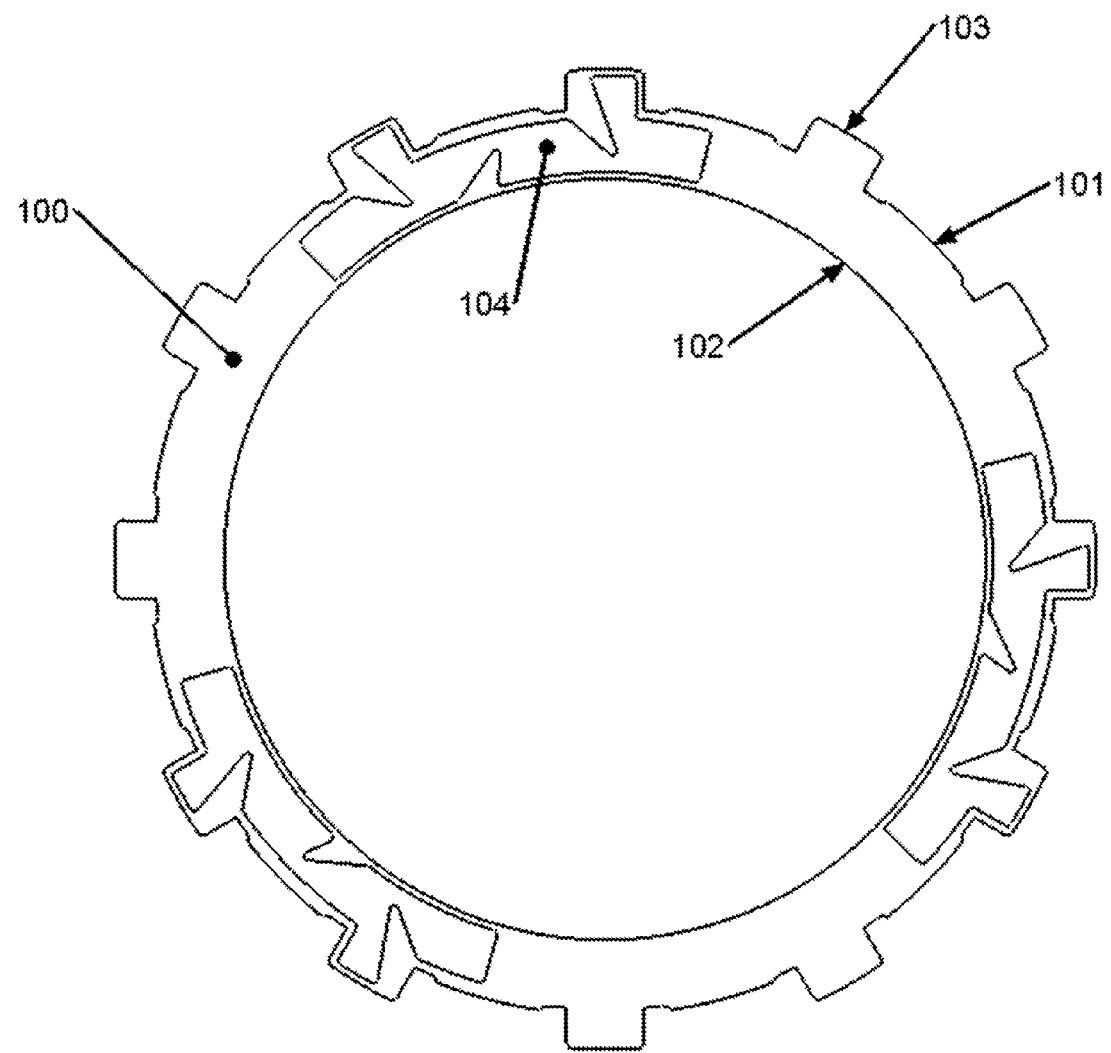
FIG. 1 is a diagram showing the improved friction plate.

FIG. 1 shows the improved friction plate 100 design. The general shape of the friction plate 100 is of typical design, having a plate inner diameter 102, a plate outer diameter 101, a plurality of tabs 103 and one or more friction pads 104. In a preferred embodiment, the friction plate 100 incorporates 3 friction pads 104. In another embodiment, the friction plate 100 incorporates 6 friction pads 104. In the preferred embodiment, the friction plate 100 has friction pads 104 bonded to both sides of the friction plate 100.

Figure 2:
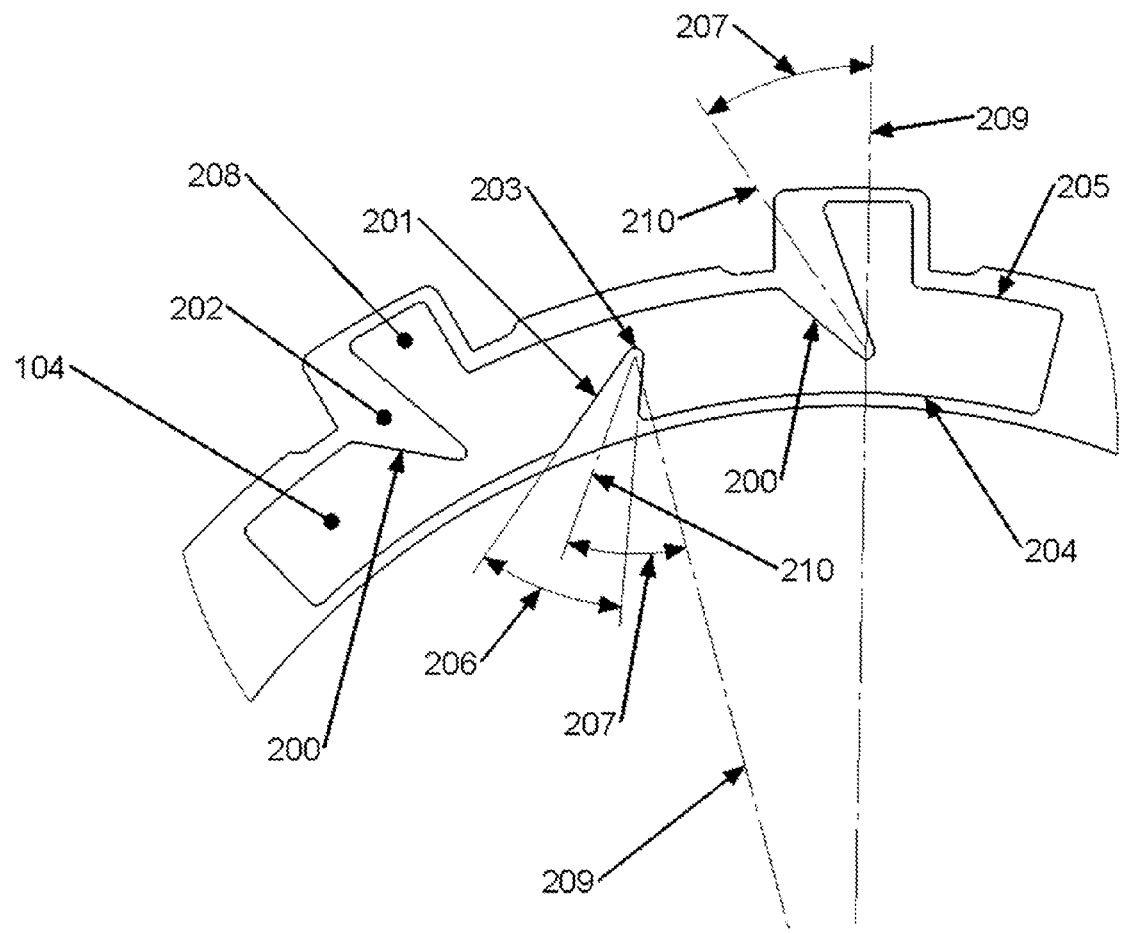
FIG. 2 is a view showing the details of the improved friction pad.

FIG. 2 shows the details of the friction pad 104 portion of the improved friction plate 100. Each friction pad 104, has a pad inner diameter 204, a pad outer diameter 205 and a pad tab portion 208. In a preferred embodiment, each friction pad 104 incorporates outer diameter V shaped grooves 200 and inner diameter V shaped grooves 201. In another embodiment, only outer diameter V shaped grooves 200 are incorporated into each friction pad 104. In another embodiment, only inner diameter V shaped grooves 201 are incorporated into each friction pad 104. In a preferred embodiment, each outer diameter V shaped groove 200 includes a portion that extends outward to the edge of the friction pad tab portion 208. In another embodiment, the outer diameter V shaped groove 200 extends only to the pad outer diameter 205.

Each V shaped groove has a groove opening 202, and a groove center point 203; the groove center point 203 being substantially near the center of the friction pad 104. The groove opening 202 can be represented as a groove opening angle 206. In a preferred embodiment, the groove opening angle 206 is 30 degrees. In another embodiment, the groove opening angle 206 is 40 degrees. Each V shaped groove is configured with a groove offset angle 207 measured between a line 209 extending from the center of the friction plate through the groove center point 203 and a position line 210 extending from the groove center point 203 through the center of inner diameter V shaped grooves 201 or outer diameter V shaped grooves 200. In a preferred embodiment the groove offset angle 207 is a positive 35 degrees representing a left-to-right groove offset angle 207. In another embodiment, the groove offset angle 207 is a negative 35 degrees representing a right-to-left groove offset angle 207. In another embodiment, the groove offset angle 207 is 0 degrees representing a groove that is symmetric relative to a line extending from the center of the friction plate and through the groove center point 203. In another embodiment the groove offset angle 207 is equal to one half the groove opening angle 206 representing a groove wherein one edge of the V groove is collinear with a line extending from the center of the friction plate.

Figure 3A:
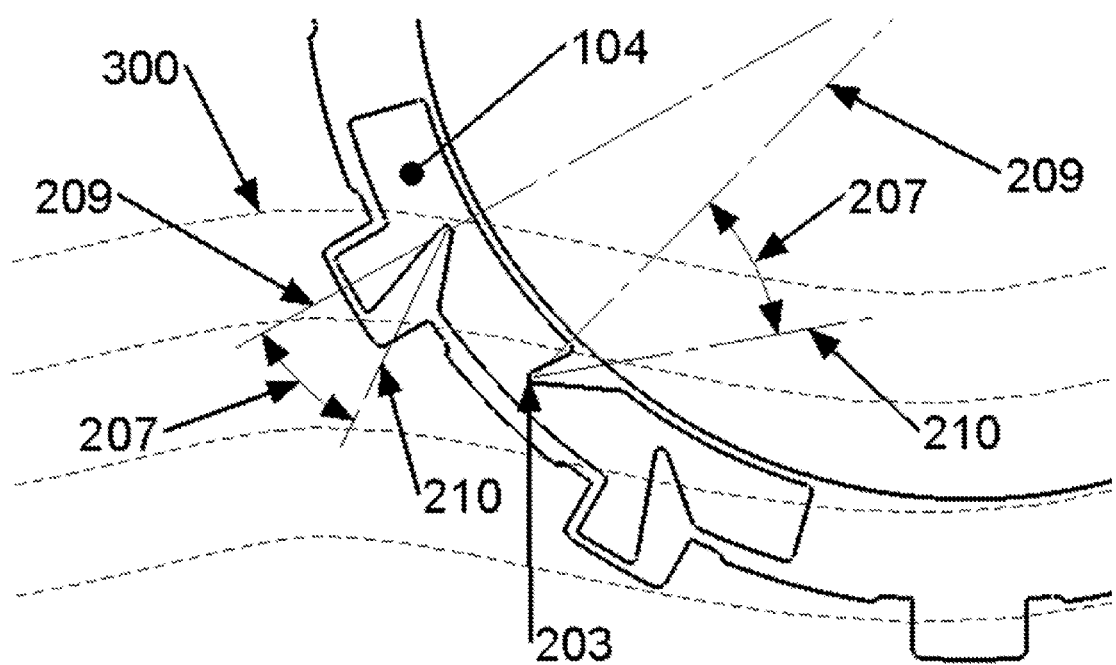
FIG. 3a is a view showing the details of the improved friction plate as it passes through an oil bath.
Figure 3B:
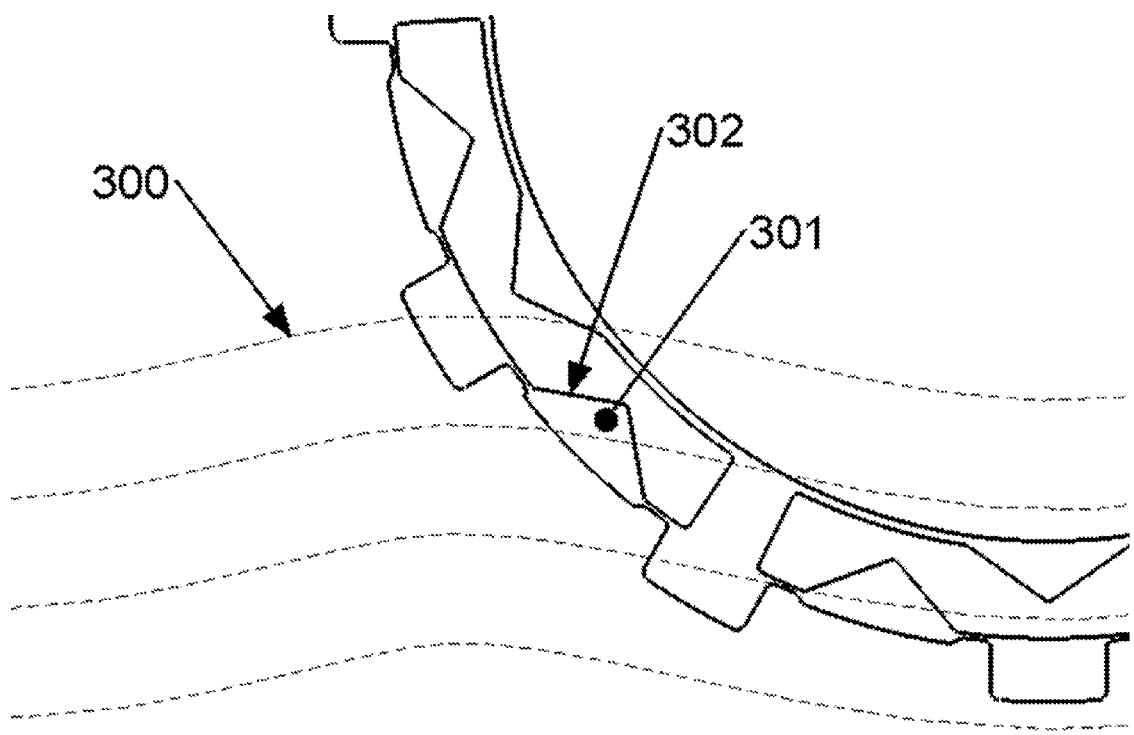
FIG. 3b is a view showing the details of the prior art friction plate as it passes through an oil bath.

As can best be seen in FIG. 3a, the groove offset angle 207 beneficially captures the rotation of the friction plate to force the oil 300 to the groove center point 203. As can be seen in FIG. 3b, the prior art symmetric outer diameter V groove 301 allows oil to escape from the trailing edge 302 of the prior art symmetric outer diameter V groove. The improved friction plate 100 will generate a higher oil pressure at the groove center point 203 versus the prior art. When the clutch is disengaged, the higher oil pressure at the groove center point 203 will provide better separation and more lubrication between the clutch friction plates and the clutch driven plates versus the prior art.

Figure 4:
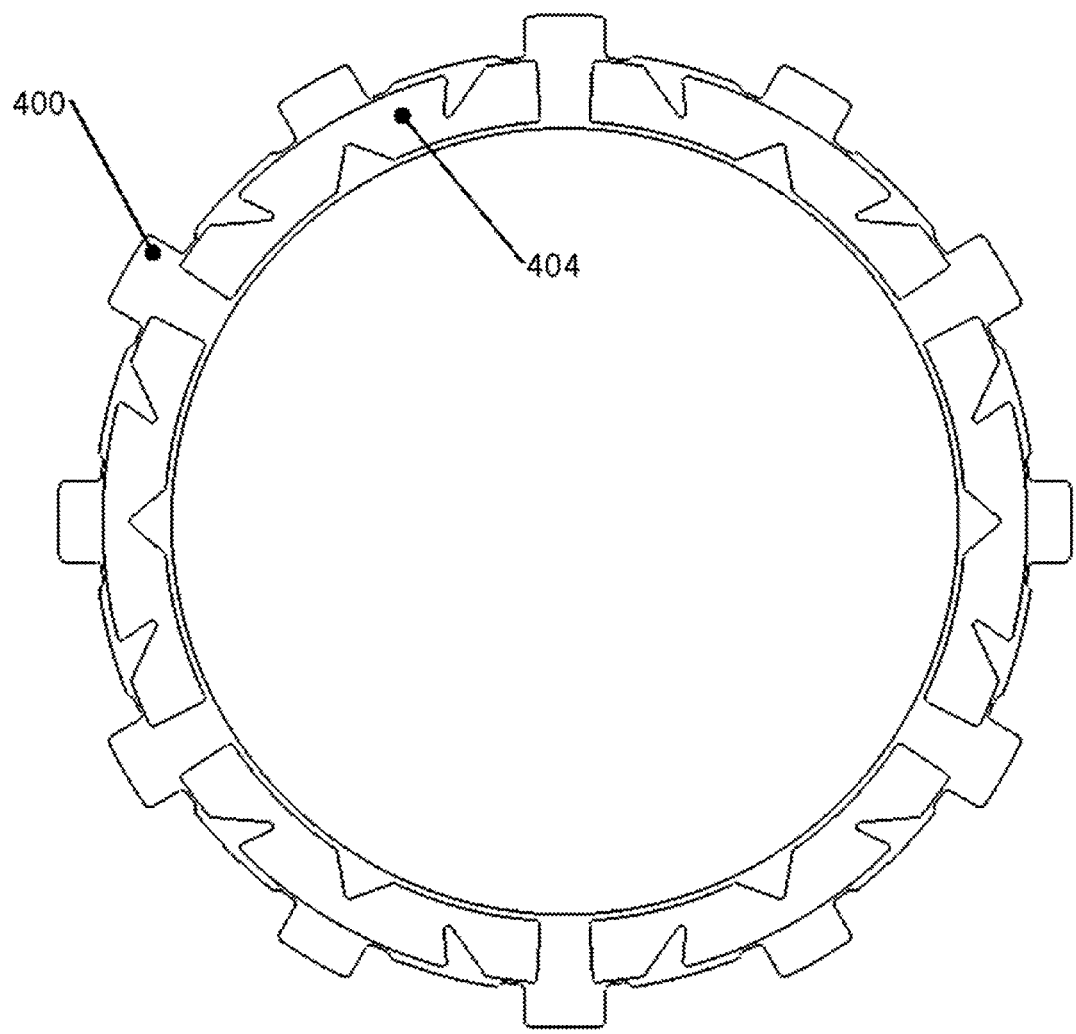
FIG. 4 is a diagram showing an alternative embodiment of the improved friction plate.
Figure 5:
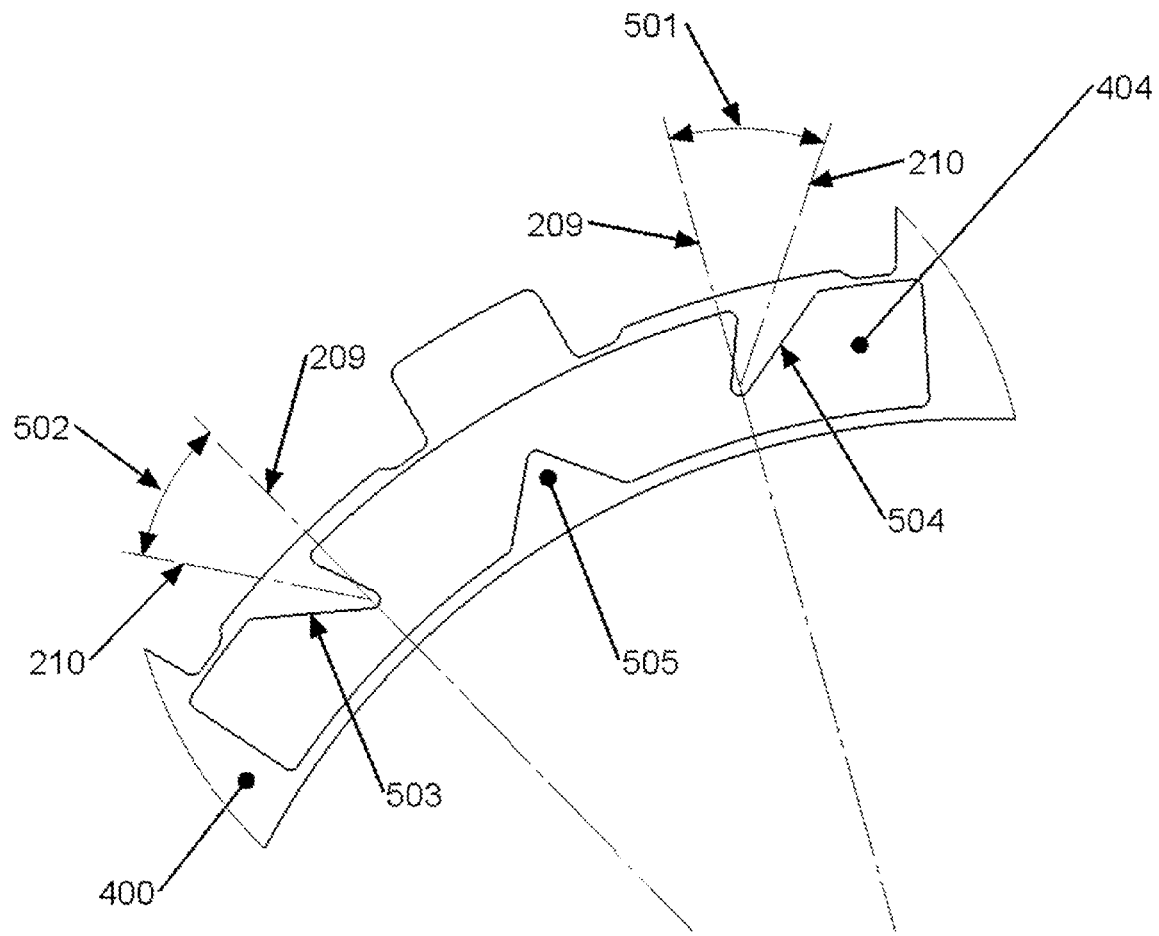
FIG. 5 is a view showing the details of an alternative embodiment of the improved friction pad.

FIGS. 4 and 5 show another embodiment of the present invention that reduces the cost of the friction pad 404 and increase the assembly efficiency of the improved friction plate 400. To reduce cost and improve assembly efficiency, the friction pad 404 should maximize the yield of the friction paper and a single friction pad 404 should perform equally when placed on either side of the friction disk 100. Typically, friction pads 404 are cut from a larger sheet of friction paper. When compared to friction pad 104, friction pad 404 utilizes less friction paper and may be organized in a tighter pattern to maximize the yield from a sheet of friction paper. The friction pad 104 of the preferred embodiment includes a friction pad tab portion 208 that reduces the yield from a sheet of friction paper. The friction pad 404 eliminates the friction pad tab portion 208 beneficially increasing yield from a sheet of friction paper while sacrificing some oil capture capability.

To ensure that the groove offset angle beneficially captures oil as the friction disk 100 rotates through the oil, the opposite side of the friction disk 100 requires a mirror image of the friction pad 104. The friction pad 404 includes a positive groove offset angle 501 and a negative groove offset angle 502. The friction pad 404 ensures that at least one outer diameter V shaped groove 503 or 504, will beneficially capture oil regardless of which side of the friction disk 400 the friction pad 404 is bonded to or which direction the friction disk 400 is rotating.

In many wet clutch configurations, the primary method of oil delivery to the inner diameter of the clutch plate 102 is through oil flow from centrifugal force. This is in contrast to the outer diameter of the clutch plate 101 which receives oil flow primarily by passing through an oil bath. For the inner diameter of the clutch plate 102, a groove offset angle does not provide the same magnitude of benefit as the groove offset angle for the outer diameter of the clutch plate 101. In this embodiment, the inner diameter V shaped groove 505 has a groove offset angle of 0 degrees to allow the groove to perform equally, regardless of the direction of rotation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A friction plate for a wet-type multiplate clutch, said friction plate being provided with a core plate and a plurality of friction pads bonded to at least one side of said core plate, said friction pads each having at least one V shaped oil groove, said V shaped oil groove having a groove center point and a groove opening angle, said groove opening angle having a groove offset angle, said groove offset angle being measured between a line extending from the center of said friction plate through the center of said groove center point and a line extending from the center of said groove center point through the center of said groove opening angle and wherein said groove offset angle is greater than one half said groove opening angle.

2. The friction pad of claim 1 wherein said V shaped oil groove has an opening towards the outer diameter of the friction plate.

3. The friction pad of claim 2 wherein said V shaped oil groove includes a portion that extends outward into a tab of said friction plate.

4. The friction pad of claim 1 wherein said V shaped oil groove has an opening towards the inner diameter of the friction plate.

5. The friction pad of claim 1 wherein at least one of said V shaped oil groove has an opening towards the outer diameter of the friction plate and at least one of said V shaped oil groove has an opening towards the inner diameter of the friction plate.

6. The friction pad of claim 5 wherein at least one of said V shaped oil groove includes a portion that extends outward into a tab of said friction plate.

7. The friction pad of claim 1 wherein said groove opening angle is 30 degrees.

8. The friction pad of claim 7 wherein said groove offset angle is 35 degrees.

9. The friction pad of claim 1 wherein said groove offset angle is 35 degrees.

* * * * *